United States Patent
Johnson

[11] Patent Number: 5,617,811
[45] Date of Patent: Apr. 8, 1997

[54] TEMPERATURE REGULATED SEAT PAD FOR A MOTOR BOAT

[76] Inventor: Brian Johnson, 9832 American Ave. SW., Tacoma, Wash. 98498

[21] Appl. No.: 590,207

[22] Filed: Jan. 23, 1996

[51] Int. Cl.⁶ ........................................... B63B 17/00
[52] U.S. Cl. ........................ 114/363; 440/88; 297/180.015
[58] Field of Search .................... 297/180.1, 180.11, 297/180.15; 165/168, 169, 41, 46; 237/12.3 R, 12.3 B; 440/88, 113; 114/343, 363, 270

[56] References Cited

U.S. PATENT DOCUMENTS

| | | | |
|---|---|---|---|
| 2,567,349 | 9/1951 | Reason | 297/180.15 |
| 3,280,896 | 10/1966 | Goodson et al. | 237/12.3 B |
| 3,283,498 | 11/1966 | Connell | 440/88 |
| 4,457,295 | 7/1984 | Roehr | 165/46 |
| 5,354,117 | 10/1994 | Danielson et al. | 297/180.15 |
| 5,429,534 | 7/1995 | Cano | 440/88 |

*Primary Examiner*—Edwin L. Swinehart
*Attorney, Agent, or Firm*—Joe Chalverus

[57] ABSTRACT

The present invention provides for controlling the temperature of a seat used in conjunction with inboard or outboard motor boats and craft. The invention extracts hot water from the circulating water pump of a motor boat engine and cool water from the high pressure side of the motor boat's intake water pump obtained from the floating medium, provides for controlling the mixture of hot and cool water and circulates the mixture through plastic water pads, returning the used water to the low pressure side of the motor boat's intake water pump. In such an arrangement, the temperature of the mixed water supplied to the water pads can be adjusted from the operating temperature of the motor boat engine to the temperature of floating medium.

13 Claims, 3 Drawing Sheets

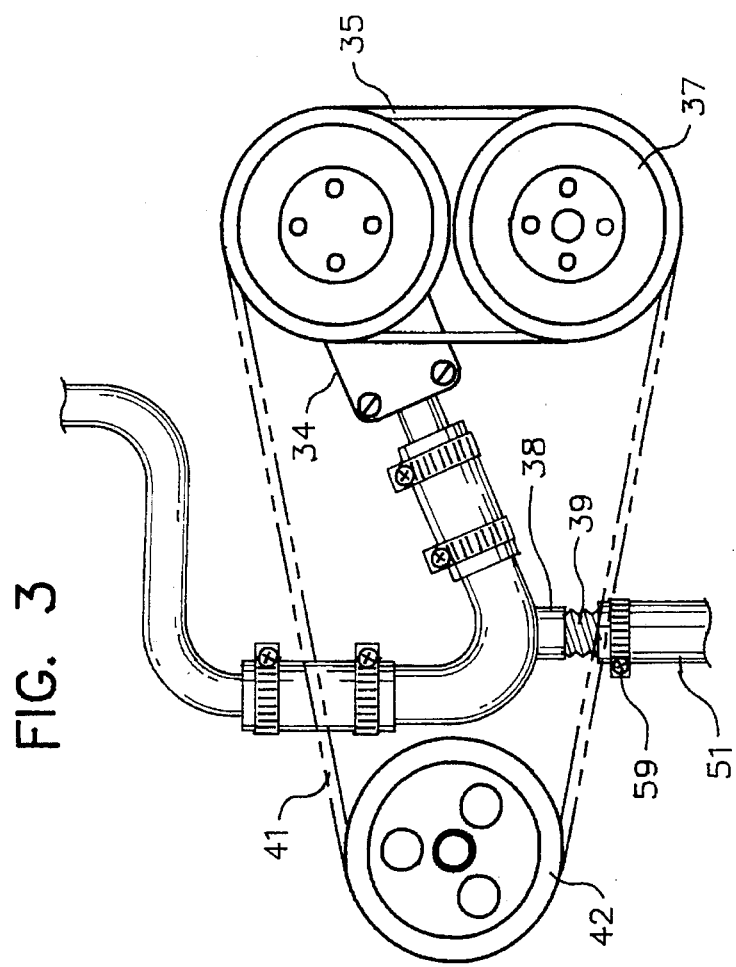
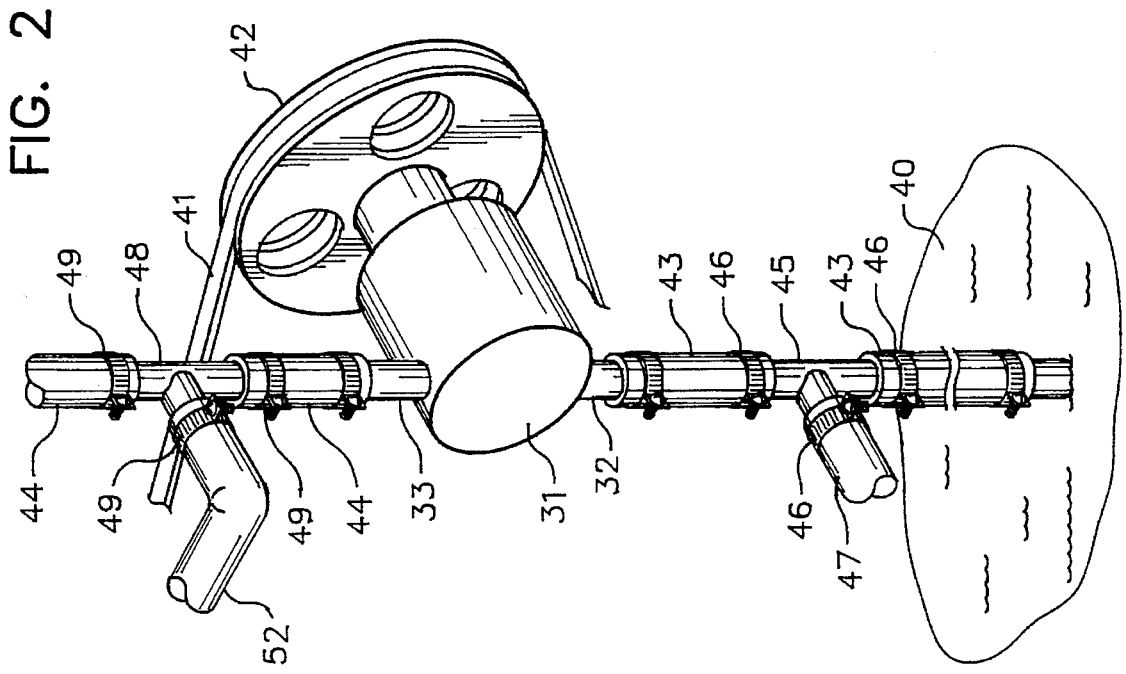

TEMPERATURE REGULATED SEAT PAD FOR A MOTOR BOAT

BACKGROUND OF THE INVENTION

1. Field of Invention

The present invention relates generally to systems to control the temperature of seats on motor boats, and more particularly to systems that use the motor boat engine as a means of heating and cooling motor boat seats.

2. Background Information

Water activities include riding in open boats powered by internal combustion engines, such as those common to the so called out-board and in-board motor boats and crafts. These boats are used for a variety of purposes, such as for work, fishing, touring, recreation, sports and the like. Often, however, the environmental temperature becomes too uncomfortable for the rider of these boats. For example, during cold temperatures, riding in an open motor boat may become too uncomfortable even when the rider uses heavy clothing to keep warm. Likewise, during very hot temperatures, a means of cooling the rider to at least the temperature of the floating medium is attractive. Even in temperatures not too hot or too cold, the rider will become chilled or fatigued after many long hours of exposure and may need supplemental heating or cooling.

Accordingly, it is an object of the present invention to provide a system which taps into the power and heat of the engine used on in-board and out board motor boats to warm or to cool the rider.

It is a further object to provide a water filled seat pad for a motor boat which will reduce fatigue while providing a source of heat or cold for the rider.

It is another object of the present invention to provide a rider with a water filled seat pad having an internal waterproof chamber to receive heated water from the engine's cooling cycle to provide heat to the rider designed to be used on a boat seat.

It is additional object of the present invention to incorporate a valve system to use water sourced from the floating medium as part of the engine's cooling cycle to provide a source of cooling to the rider.

It is a further object of this invention to provide for an adjustable means to mix heated water from the engine's cooling cycle with relatively cooler water from the engine's water intake system to control the temperature of the water from the maximum temperature of the heated water sourced from the engine's cooling cycle to the temperature of the water sourced from the floating medium.

A purpose therefore, is to take advantage of the pumping mechanisms of the boat's engine to adjustable mix water from the engine cooling system with water from the floating medium, such as a lake, steam or ocean to provide for one or more temperature controlled seat pads on the boat for the rider.

It is a further object of the present invention to provide a system to cool the temperature of a motorboat seat pad for times when the environmental temperature is too warm to be comfortable and to heat the temperature of the motorboat seat pad for times when the environmental temperature is too cold to be comfortable.

In addition to the foregoing objects it is also an object to provide a system which can be easily and quickly installed in conjunction with seats and internal combustion engines already existing on a motor boat, and also to provide an elegant, safe and compact means of heating and cooling he rider and making the ride more comfortable.

BRIEF SUMMARY OF THE INVENTION

The present invention is embodied in a system that can be used on any motor boat having an internal combustion engine using a thermostat controlled circulating cooling cycle with intake pump.

In general, small engines used for motor boats do not use a secondary cooling cycle to remove waste heat from the engine as is commonly used on land vehicles such as cars and trucks having either heat exchanger or radiators to release heat.

Instead of a closed secondary cooling system with external radiator and pump to cycle engine coolant through a heat exchanger as is common in land vehicles, a motor boat engine takes advantage of an unlimited source of cool water contained within the floating medium by using a circulating cooling system with a thermostat controlled temperature regulator and intake pump. As the temperature of the engine coolant reaches the operating temperature of the engine, the thermostat releases a controlled amount of the hot water which is replaced by water from the high pressure side of an intake pump. It is common to release the hot water into the exhaust manifold which will cool the exhaust and quiet the engine. The low pressure side of the intake pump obtains relatively cool water from the floating medium to replace the hot water released from the engine. A typical upper limit operating temperature of the hot water is 140 to 180 degrees, the exact temperature varying according to the installed engine thermostat. The thermostat controlled temperature regulator and intake pump operate such that once the engine is at operating temperature, there appears to be a continuous release of hot water at or near the operating temperature of the engine. Further, there appears to be a continuous uptake of new cooler water from the floating medium replacing the released hot water.

My invention takes advantages of these features of the engine to provide for a system that takes some of the circulating water from the engine and some of the water from the intake pump, to mix together to obtain a water temperature which can be controlled to between the relatively hot operating temperature of about 140 to 180 degrees and the relatively cool water of the floating medium. The mixed water is conducted to a flexible pad fitted to the boat seat. The temperature of the pad can be adjusted between the temperatures of the two water sources. The outflow from the seat pad is returned to the cooling cycle of the engine at the low pressure side of the intake pump, to be recycled again into the pad or to the recirculating system of the engine.

By taping into the mixed water fluid conduit and the return line to the engine, the mixer could be used to control the temperature of multiple seat pads at the same time. In addition, the water from the engine's pumps is available for a variety of uses on the boat, such as for showering, or cleaning the boat, etc.

BRIEF DESCRIPTION OF THE DRAWING

FIG. 2 is an elevational view of the intake water pump of the engine with the connecting hoses in accordance with my invention;

FIG. 3 is an elevated view of the circulation water pump of the engine with the hose connections in accordance with my invention;

DESCRIPTION OF THE PREFERRED EMBODIMENTS

Figure 1:
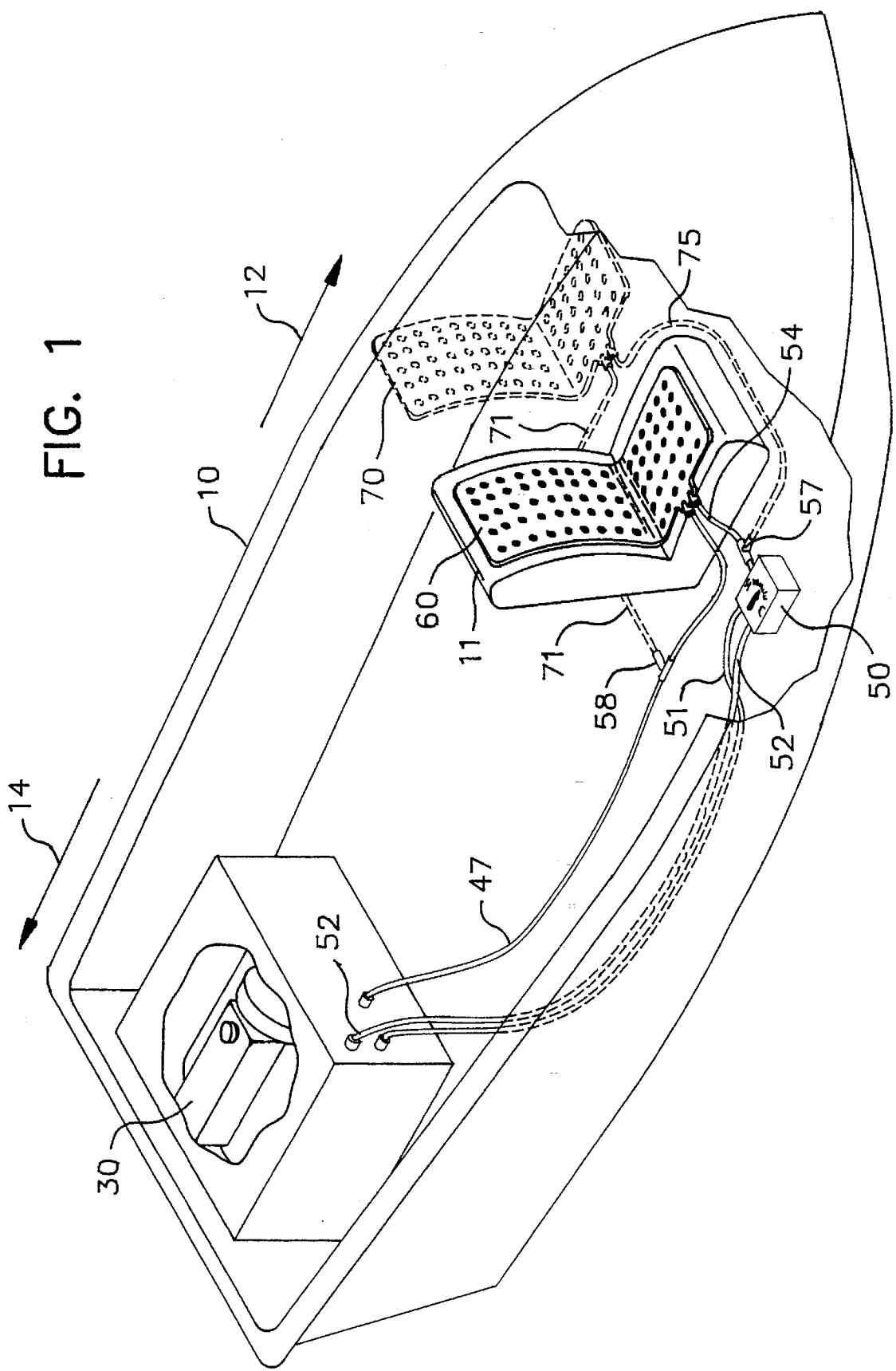
FIG. 1 is a perspective general view of a motor boat in accordance with the present invention.

FIG. 1 shows a idealized perspective view of a motor boat 10 in accordance with the present invention, having a seat 11 towards the forward part 12 of the boat and an engine 30 or inboard motor towards the rearward part 14 of the boat. It should be understood that are many different manners of boats with engines, either outboard or inboard. However, my invention is adaptable to any of the combinations and configurations of inboard/outboard engines on motor boats.

I use the term boat engine to mean any engine using the floating medium to control or moderate the operating temperature of the engine. That is, the engine is designed to expel a portion of its recirculating hot water when the maximum performance temperature is reached, replaced by new and cooler water from the floating medium. The objects of my invention are obtained by connecting into the cooling water and hot water circulation systems of the engine. The connections needed to achieve this is shown in FIG. 2, and FIG. 3. The inboard or outboard engine 30 has an intake water pump 31 having a low pressure side 32, and a high pressure side 33. The low pressure side 32 of the intake water pump 31 withdraws water from the floating medium 40 and provides the engine at the high pressure side with an unlimited source of cooling water. The floating medium 40 can be either fresh water or salt water.

Figure 4:
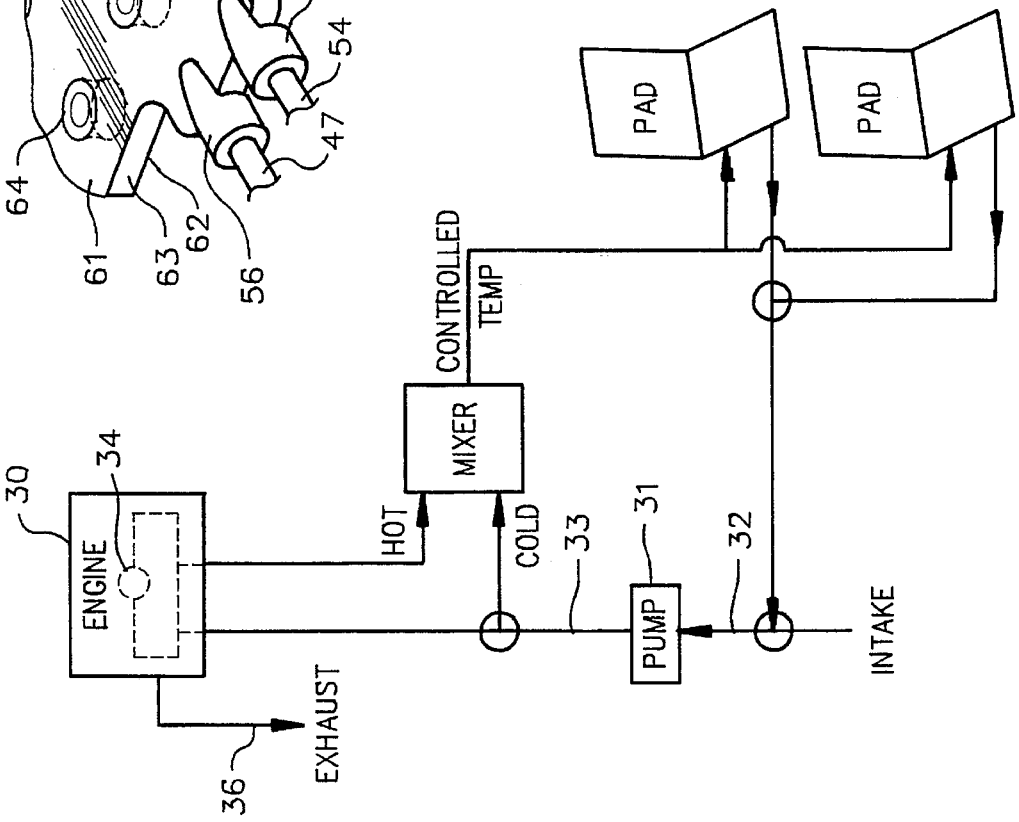
FIG. 4 is an operational diagram of the invention.

Flow diagram FIG. 4 shows the engine 30 also has a circulating pump 34 (dotted line) which circulates the water through the interior of the engine (not shown). As the water circulates within the engine 30 the water absorbs heat resulting from the combustion process of the engine 30, raising the temperature of the circulating water. As the temperature of the circulating water reaches the maximum operating temperature of the engine 30, a thermostat (not shown) releases a controlled portion of the circulating water into an exhaust at 36. The water circulating within the engine is replenished by new water from the high pressure side 33 of the intake water pump 31. The new water joins the recirculating water within the engine thereby controlling the temperature of the circulating water.

A typical upper limit operating temperature of the hot water in the boat engine is 140 to 180 degrees, the exact temperature varying according to the installed thermostat for the particular boat engine. In operation, there appears to be a continuous release of water at or near the maximum operating temperature of the boat engine 30. This outflow is usually conducted to the exhaust (36) on a manifold (not shown) on the boat engine where the expelled water helps cool the exhaust and quiet the sound of the boat engine. There also appears to be a continuous intake of new cool water from the floating medium to replace the released hot water.

As explained above, my invention provides for tapping into the circulating water system of the boat engine to retrieve hot water, as shown in FIG. 2 and FIG. 3. Most inboard boat engines have a threaded drain plug fit into a matching drain access 38 communicating with the circulating water system. As shown in FIG. 3 The drain access 38 is usually located at one end of the inboard boat engine 30 near the circulating pump 34 and is designed to be used to clean the circulating system of the boat engine. For inboard boat engines, the circulating pump 34 is usually driven by a drive belt 35 and motor power wheel 37 alone, or in conjunction with another pulley powered device 42, near the front of the boat engine. It is fairly simple to locate the drain access 38 on the circulating water system near the circulating pump 34. The drain access 38 usually has a threaded plug (not shown). Once the plug is removed the plug is replaced by a matching threaded tap 39, fit to a hose 51 either by a press fit, or using a hose clamp 59. This will be the hot water source for the seat pad. While different diameter hoses could be used, it is noted that the hose must withstand the highest temperature of the engine's circulating hot water. I find that half inch heater hose of the type commonly used on automobiles suitable for this purpose since the hose and hose clamps are very available.

Referring to FIG. 2 to tap into the intake water system, first locate the intake water pump. For inboard boat motors, it is also located at the at the front end of the boat engine 30 driven by a drive belt 41, and could also be on same pulley belt 35 as the circulating pump 34. There will be two hoses attached to the intake water pump 31, one hose 43 leads through the hull to the floating medium under the boat. That is, hose 43 is the low pressure side of the intake water pump 31, connecting to the floating medium 40 below the boat. The other hose 44 leads to the water circulating system as described above. FIG. 2 shows hose 44 as the high pressure side of the intake water pump 31. The hoses are usually one inch diameter rubber hoses for many boat engines, which could vary according to the size and make of the engine. The hoses can be cut and tees 45 and 48 used to rejoin the hoses, providing an access to the low pressure side and the high pressure side of the intake water pump. The tees should be sized so that they will join hoses 43 and 44 respectively, while the tap of the tees sized to match the cold water supply 52 and return fluid hose 47. The splice into the hoses can be made anywhere along the length of the hoses and should be chosen for convenience. On FIG. 2 there is shown hose 43 on the low pressure side of the intake water pump 31 having a tee 45 with hose clamps 46 to secure the ends of severed hose 43 and return fluid hose 47 connected to the tap of tee 45. Standard sealant could be used in conjunctions with these modifications, if necessary. Also shown on FIG. 2 is the modified hose 44 on the high pressure side of the intake water pump 31 having a tee 48 with hose clamps 49 to secure the ends of the severed hose 44 and cool water supply hose 52 connected to the tap of the tee 48. As described above, hose 52 is sized according to the size of the tap of the tee 48 with a length sufficient to reach the mixing valve 50 located near the boat seat 11, shown in FIG. 5. Hose 47 is sized according to the size of the tap of the tee 45 with a length sufficient to reach the seat pad 60.

The hot water from the boat engine is conducted from the 24 threaded tap 39 of the drain access 38 by tube 51 to the hot intake port of a controlled mixing valve 50. The cool water is conducted from the tee 48 by hose 52 to the cool intake port of the controlled mixing valve 50. The control mixing handle 53 regulates to portion of hot water from hose 51 to be mixed with the cool water from hose 52 thereby providing a mixed water having an adjustable temperature, from the mixed water port 54 or output of the controlled mixing valve. The controlled mixing valve 50 is capable of mixing the hot water with the cold water, within the range of the hottest water to the mixed water output 54, to the coldest water to the mixed water output 54, or any mixed portion between these. The user can adjust the percentage of hot to cool water by adjusting the control mixing handle 53, according to the desire of the user.

Figure 5:
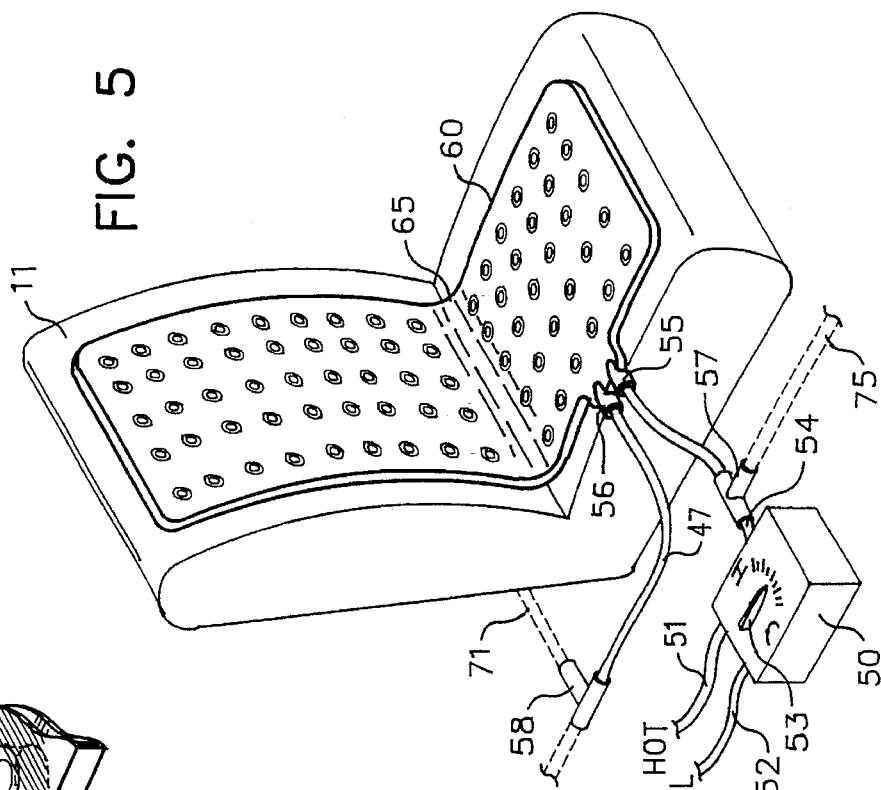
FIG. 5 is a perspective view of the mixing valve in conjunction with the seat pad and motor boat seat.
Figure 6:
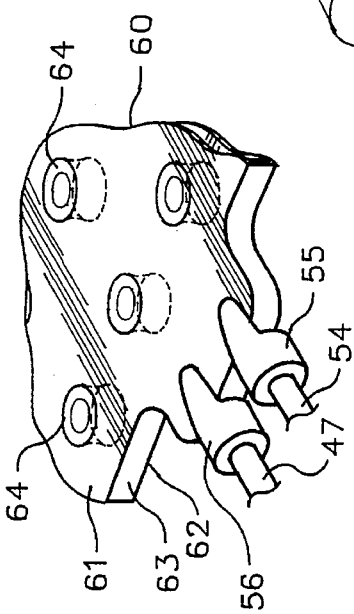
FIG. 6 is a partial expanded view of a temperature regulated seat pad in accordance with my invention.

Referring to FIG. 5 and FIG. 6, the mixed water output 54 is conducted to an inlet 55 of the seat pad, shown generally as 60. The seat pad 60 is generally a waterproof chamber made of flexible plastic, such as vinyl commonly used in hospitals to provide supplemental heat to patients in bed using circulating hot water. The pads are water-proof, having a top membrane 61, a bottom membrane 62 which are sealed along the edge 63. A number of structural elements 64 constrain the top membrane 61 to the bottom membrane 62 so that under pressure from within, the waterproof chamber takes the form of a padded rectangular cushion sufficiently pliable to conform to any essentially flat surface such as a hospital bed, or for my use, of the boat seat 11. As shown in FIG. 1 and FIG. 5, the seat pad 60 can be folded at 65 so that a first portion of the pad becomes a back pad while the second portion of the pad remains a seat pad. Clearly, should the boat not have seats with backs but comprise a plank (not shown) to form a seating bench (not shown), the pad 60 could conform to the plank with both portions becoming seats, both portions of the pad 60 lying flat on the seating bench permitting two persons to use the pad. There are other useful configurations for the pad shown such as placed inside a coat or jacket, folded around feet, set on a person's lap o installed inside a seat itself. These and other configurations would be obvious to the user and equivalent to use of my invention.

To complete the water circuit for my invention, the used water from the pad 60 returns from outlet 56 on the pad to the return fluid hose 47 which is connected to the low pressure side of the intake pump at tee 45 shown in FIG. 2. This configuration permits the used water to be recirculated by the intake water pump, through the system again.

Because of the availability of a mixed source of heated or cool water from the floating medium, additional features of my invention can readily be appreciated. Obviously with my invention, more than one seat could be attached to the system to provide the advantages and objectives of my invention. Additional pads, shown in FIG. 1, in general as another pad 70 (shown in broken lines), may be similar to seat pad 60 and can be connected to my system in parallel, that is, by tapping into the mixed water supply hose 54, shown here using tee 57 (shown in broken lines) to supply mixed water to 70 along line 75 (broken line) on the mixed water output from the mixing valve at 54. The used water from the additional pad 70 is then returned along line 71 (broken line) to tee 58 on the low pressure side of the intake water pump at returned water hose 47. In FIG. 1 and FIG. 5, the used water from the additional seat pad 70 is returned to the low pressure side of the intake pump by connected into line 47 using line 71 (broken lines) connected at tee 58 (broken lines).In this way, both the driver of the boat and one or more passengers could derive the benefit of my invention.

Furthermore, the mixed water output from hose 54 could be used as a source of showering, or hot water for scrubbing the boat. The water is easily and conveniently obtained by taping into hose 54 to convey the water to a shower head, or faucet as easily as additional seat pads. In these cases, it would be necessary to plug the return line 47 since the waste water from showering or cleaning the boat does not need to be returned to the low pressure side of the intake pump.

Although the present invention is described and illustrated herein by reference to a preferred embodiment, it should be understood that various substitutions, modifications and alterations that may be apparent to one skilled in the art may be made without departing from the essential spirit of the invention. Accordingly, the scope of the present invention is defined by the following claims.

I claim:

1. A temperature regulated seat pad apparatus for a boat with motor comprising:

a waterproof chamber within said seat pad;

said motor having a circulating water pump and an intake water pump having a low pressure side and a high pressure side;

a means to combine water from the circulating water pump with water from the high pressure side of the intake water pump;

a means to discharge water from the chamber; and a means to convey the combined water to the chamber, the temperature of the seat pad regulated by the combination of water from said circulating water pump and water from the high pressure side of the intake water pump.

2. The temperature regulated seat pad apparatus as described in claim 1, said means to discharge water from the chamber comprising:

a hose to convey water from the chamber to the low pressure side of the intake water pump.

3. The temperature regulated seat pad apparatus as described in claim 2, said means to combine water comprising:

a mixing valve with a first input, a second input and a combined water output, a warm fluid conduit communicating between the circulating water pump and the first input;

a cool fluid conduit communicating between the high pressure side of said intake pump and the second input;

a mixed fluid conduit conveying said combined water from the combined water output from said valve to the chamber.

4. The temperature regulated seat pad apparatus as described in claim 2, said mixing valve further comprising:

a mixing valve having a variable control means to regulate the water flowing into the first input and the water flowing into the second input, the temperature of the mixed water adjustable from the temperature of the water in the first input to the temperature of the water in the second input according to the variable control means.

5. A temperature regulated seat pad apparatus having a waterproof chamber in combination with a motor boat engine having a circulating water pump, an intake water pump having a low pressure side and a high pressure side and a temperature controlled water discharge means, comprising:

a mixing valve having a variable control means, said valve having a first input, a second input and a mixed output, a warm fluid conduit communicating between the circulating water pump and the first input;

a cool fluid conduit communicating between the high pressure side of said intake pump and the second input;

a mixed fluid conduit communicating between the mixed output and the chamber, the temperature of the pad related to combination of water in the first input and the second input;

and a return fluid conduit communicating between the chamber and the low pressure side of the intake pump water.

6. The temperature regulated seat pad apparatus, as claimed in claim 5 further comprising:

variable control means to control the combination of water to the first input with water to the second input water thereby regulating the temperature of the pad within the temperature of the water to the first input and the water to the second input.

7. A temperature regulated seat pad apparatus having a waterproof chamber in combination with a motor boat engine having a circulating water pump, an intake water pump having a low pressure side and a high pressure side and a temperature controlled water discharge means, comprising:

a means to mix water from the circulating water pump with water from the high pressure side of the intake water pump and conveying said mixed water to the seat pad; and a means to discharge water from the seat pad.

8. A temperature regulated seat pad apparatus as claimed in claim 7, further comprising a means to control the amount of water from the circulating water pump mixed with the amount of water from the high pressure side of the intake water pump thereby regulating the temperature of the resulting mixed water conveyed to the seat pad.

9. The temperature regulated seat pad apparatus as claimed in claim 7 where the means to discharge water from the seat pad conveys the discharge water to the low pressure side of said intake water pump.

10. A temperature regulated seat pad apparatus for a boat with motor comprising:

a waterproof chamber within said seat pad;

said motor having a circulating water pump and an intake water pump having a low pressure side and a high pressure side;

a means to combine water from the circulating water pump with water from the high pressure side of the intake water pump;

a hose to convey water from the chamber to the low pressure side of the intake water pump; and a means to convey the combined water to the chamber, the temperature of the seat pad regulated by the combination of water from said circulating water pump and water from the high pressure side of the intake water pump.

11. A temperature regulated seat pad apparatus as described in claim 10, said means to combine water comprising:

a mixing valve with a first input, a second input and a combined water output, a warm fluid conduit communicating between the circulating water pump and the first input;

a cool fluid conduit communicating between the high pressure side of said intake pump and the second input;

a mixed fluid conduit conveying said combined water from the combined water output from said valve to the chamber.

12. A temperature regulated seat pad apparatus as described in claim 10, said means to combine water comprising:

a mixing valve having a variable control means to regulate the water flowing into the first input and the water flowing into the second input, the temperature of the mixed water adjustable from the temperature of the water in the first input to the temperature of the water in the second input according to the variable control means.

13. A temperature regulated seat pad apparatus having a waterproof chamber in combination with a motor boat engine having a circulating water pump, an intake water pump having a low pressure side and a high pressure side and a temperature controlled water discharge means, comprising:

a means to mix water from the circulating water pump with water from the high pressure side of the intake water pump and conveying said mixed water to the seat pad and means to discharge water from the seat pad to the low pressure side of said intake water pump.

* * * * *